Oct. 14, 1941.    D. L. McNEAL    2,258,783
BRAKE CONTROL MEANS
Filed June 28, 1940
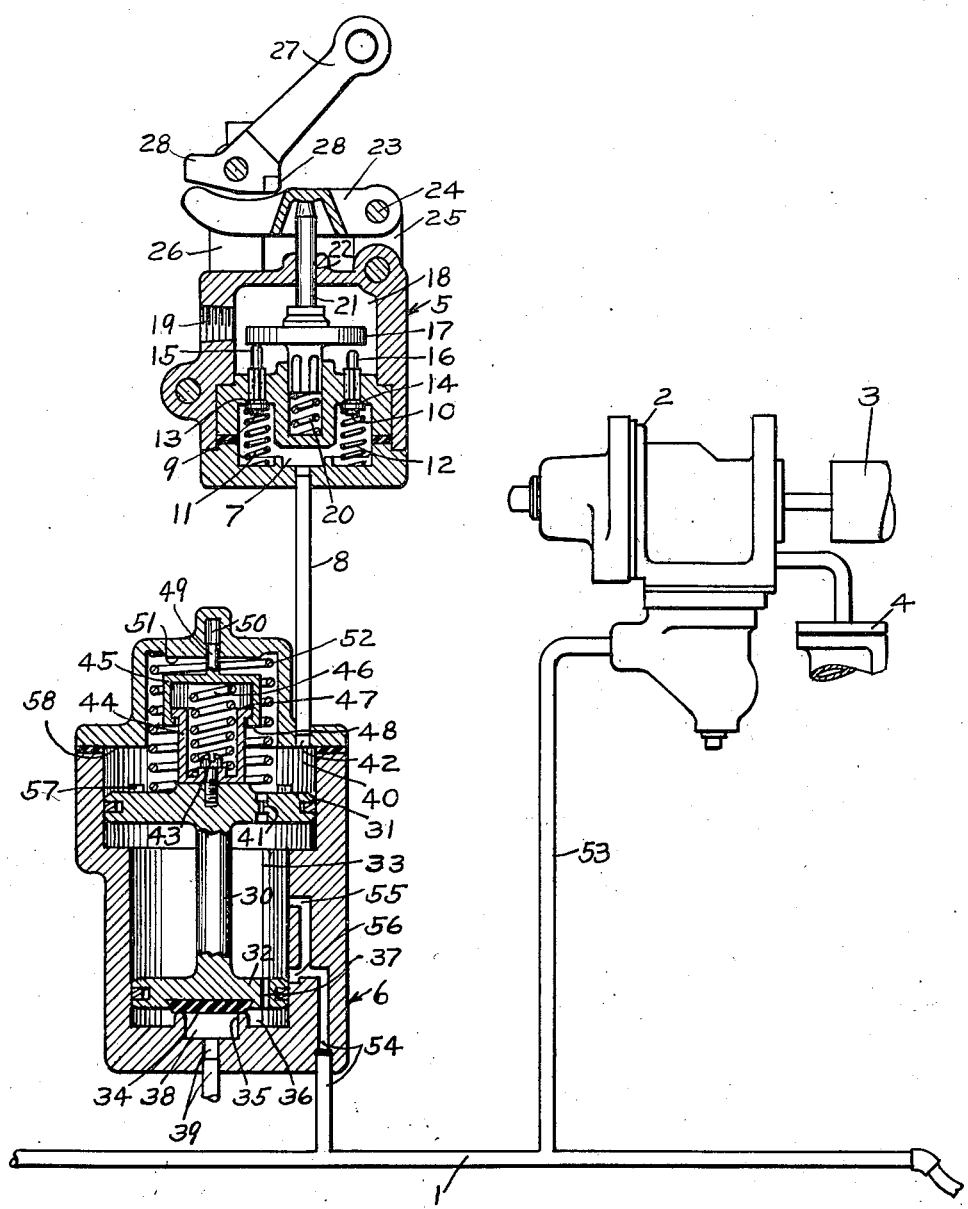
INVENTOR
DONALD L. McNEAL
BY
*A. M. Higgins*
ATTORNEY Patented Oct. 14, 1941

2,258,783

UNITED STATES PATENT OFFICE 2,258,783

BRAKE CONTROL MEANS

Donald L. McNeal, Wilkinsburg, Pa., assignor to The Westinghouse Air Brake Company, Wilmerding, Pa., a corporation of Pennsylvania Application June 28, 1940, Serial No. 342,928

9 Claims. (Cl. 303—47)

This invention relates to railway brake systems of the fluid pressure type and more particularly to means whereby a trainman may control an application of the brakes from any one of a plurality of points in the train.

The principal object of the invention is to provide means whereby a trainman on a train of cars may make either a service or an emergency application of the brakes.

In the present embodiment of the invention this object is accomplished by means of a manually operative control valve device for controlling the operation of a brake application valve device which is adapted to effect a reduction in brake pipe pressure at either a service or an emergency rate.

In the accompanying drawing, the single figure is a diagrammatic view, partly in section, of a fluid pressure brake system for a railway vehicle, and embodying my invention.

As shown in the drawing, the equipment may comprise the usual brake pipe 1, a triple valve device 2, an auxiliary reservoir 3, a brake cylinder 4, a manually operative control valve device 5 and a brake application valve device 6.

The triple valve device 2, the auxiliary reservoir 3 and the brake cylinder 4 are of the usual well known type. The triple valve device 2 is operative upon an increase in the pressure of fluid in the brake pipe in charging the equipment to establish a communication between the brake pipe and the auxiliary reservoir through which fluid under pressure may flow from the brake pipe to the auxiliary reservoir. At the same time, the triple valve device is adapted to connect the brake cylinder to the atmosphere to effect a release of the brakes in the usual well known manner. The triple valve device 2 is operative upon either a service or an emergency rate of reduction in the pressure of fluid in the brake pipe to cut off communication between the brake pipe and the auxiliary reservoir and between the brake pipe and the atmosphere and at the same time establish communication between the auxiliary reservoir and the brake cylinder through which fluid under pressure may flow from the auxiliary reservoir to the brake cylinder to effect either a service or an emergency application of the brakes.

The manually operative control valve device 5 is for controlling the operation of the brake application valve device 6 and is a relatively small valve device which is mounted within the car body at a point located remotely from the application valve device and is connected to the application valve device by a branch pipe of relatively small diameter. This control valve device comprises a casing having a chamber 7 which is in constant open communication with a pipe 8. Contained in this chamber is a pair of valves 9 and 10 and a pair of springs 11 and 12 for normally seating the valves 9 and 10 respectively, on their respective valve seats 13 and 14. The valves 9 and 10 are provided with upwardly extending stems 15 and 16 respectively which are adapted to be engaged by a plunger 17 for unseating the valves 9 and 10. As shown in the drawing, the upper end of the stem 15 may normally engage the plunger 17 and the upper end of stem 16 is spaced a predetermined distance therefrom. The plunger 17 is disposed in a chamber 18 which is in constant open communication with the atmosphere by way of a passage 19 and is normally maintained in the position shown by means of a spring 20.

The plunger 17 is provided with an upwardly extending stem 21 which is guided in a central bore 22 formed in the casing and is adapted to be engaged by a lever 23 for actuating the plunger 17, which lever 23 is fulcrumed on a pin 24 in a lug 25 projecting from the casing. Pivotally mounted on another lug 26 is another lever 27 provided with an arm 28 adapted to engage the lever 23, for rotating the lever 23 counterclockwise, so as to actuate the plunger 17 and thereby successively unseat the valves 9 and 10 which when unseated establish communication between chambers 7 and 18.

The brake application valve device 6 which is operative to effect either a service or an emergency reduction in brake pipe pressure is mounted beneath the car body and is connected to the brake pipe with the shortest possible branch pipe.

This brake application valve device 6 comprises a casing containing a piston stem 30 having at one end a piston 31 of one diameter and at the opposite end a piston 32 of smaller diameter which pistons, together with the casing define a chamber 33. The lower side of the piston 32 is provided with a valve 34 which is adapted to seat on an annular rib 35 carried by the casing. Outside of the seat rib 35 is a chamber 36 which is in constant open communication with the chamber 33 by way of a port 37 of such flow area as to provide for a service rate of flow of fluid therethrough. Inside the seat rib is a chamber 38 which is in constant open communication with the atmosphere by way of passage and pipe 39. With the valve 34 seated, as shown in the drawing, communication between chambers 36 and 38 is cut off.

At the upper side of the piston 31 is a chamber 40 which is in constant open communication with the chamber 33 by way of restricted port 41 and which is also in constant open communication with a passage 42 leading to pipe 8 which, as hereinbefore described, is in constant open communication with valve chamber 7 of the valve device 5. Contained in chamber 40 and secured to the upper face of the piston 31 by means of a screw 43 is a collapsible regulating stop for preventing, as will hereinafter more fully appear, the piston 31 from moving to its uppermost or emergency position, when a reduction in the pressure of fluid in chamber 40 is effected at a service rate, due to operation of the valve 9, and which will permit the piston to move to its uppermost or emergency position, when a reduction in the pressure of fluid in chamber 40 is reduced at an emergency rate, due to the operation of both the valve 9 and the valve 10.

This stop may comprise hollow sections 44 and 45 which are in the form of tubes telescopically arranged to slide relative to each other and which are held in their expended position by the action of a spring 46. The overlapping end edges of the sections are interlocked in position by the engagement of overlapping flanges 47 and 48 provided on the sections 44 and 45 respectively. The end wall of the section 45 is provided with an exterior projection 49 which is slidably received in a guide recess 50 provided in the casing. With the piston 31 in its normal position as shown, the end wall of section 45 of the stop is spaced a short distance from the adjacent end wall 51 of the casing.

Also contained in chamber 40 and encircling the stop is a spring 52. This spring is interposed between the face of the piston 31 and the inner wall of the casing and normally acts to maintain the pistons 31 and 32 in the position shown in the drawing.

It has been found that additional brake pipe volume, added by branch pipes leading to auxiliary devices, etc., has the effect of slowing up both the application and a subsequent release of the brakes. When a number of such equipments, as just described are operatively connected together, such as in a train, and a reduction in brake pipe pressure is made either by the usual brake controlling valve device on a locomotive or head car of a train, or by means of the manually operative control valve device from one of the cars within the train, it is very desirable that a reduction in brake pipe pressure be transmitted or propagated as rapidly as possible, so as to apply the brakes throughout the train as nearly in synchronism as possible and thereby bring the train to a prompt stop without harsh run in or closing of the slack in the train.

It will be noted that in the present embodiment of the invention, the application valve device 6 is connected to the brake pipe with the shortest possible branch pipe and that the control valve device 5 is a relatively small device which is connected to the application valve device with a branch pipe of relatively small diameter so that the volume added to the brake pipe is reduced to a minimum.

*Operation*

In initially charging the equipment for use in service, fluid under pressure is supplied to the brake pipe 1 in the usual and well known manner. From the brake pipe fluid under pressure flows through a branch pipe 53 and the triple valve device 2 to charge the auxiliary reservoir 3 to the pressure carried in the brake pipe, as hereinbefore described.

Fluid under pressure also flows from the brake pipe 1 to the chamber 7 of the manually operative control valve device 5. This communication is established by way of pipe and passage 54, ports 55 and 56 in the casing of the brake application valve device 6, chamber 33, restricted port 41 in piston 31, chamber 40, passage 42 and pipe 8. Fluid under pressure supplied to chamber 33 also flows through port 37 to chamber 36.

It will be understood that fluid under pressure equalizes from chamber 33, through the restricted port 41 in the piston 31 to chamber 40, so that normally the pressure of fluid in chamber 40 together with the pressure of the spring 52, hold the pistons 31 and 32 in the position shown in the drawing, so that valve 34 is maintained seated on the rib 35 and communication between chambers 36 and 38 is cut off.

If the trainman desires to effect a service application of the brakes, he moves the handle 27 of the control valve device 5 either to the left or the right of the normal position in which it is shown on the drawing. When the handle is moved from its normal position to either of these positions, one or the other end of arm 28 will engage the lever 23 and cause it to move in a counterclockwise direction which movement will force the plunger 17 inwardly and thereby force the valve 9 from its seat 13 against the opposing pressure of the spring 11. The movement of the handle to effect a service application of the brakes will be permitted to stop before the plunger 17 unseats the valve 10.

With the valve 9 thus unseated fluid under pressure in chamber 40 of the brake application valve device 6 is vented to the atmosphere, by way of passage 42, pipe 8, chamber 7 past unseated valve 9, chamber 18 and passage 19. The rate of venting, however, is limited to a predetermined rate, by the flow area of the passage between chambers 7 and 18 past unseated valve 9 in the control valve device 5, to insure proper operation of the pistons 31 and 32 in the brake application valve device 6 as will hereinafter more fully appear.

When fluid is vented from chamber 40, the fluid pressure acting in chamber 33 overcomes the opposing pressure of the spring 52 causing the pistons 31 and 32 to move upwardly until the end wall of section 45 of the stop carried by the piston engages the adjacent end wall 51 of the casing. When this occurs the pistons 31 and 32 are brought to rest by action of the spring 46. With the pistons 31 and 32 in this position the port 56 leading from passage and pipe 54 to the chamber 33 is cut off by means of piston 32 and valve 34 is moved away from the annular seat rib 35 thereby establishing communication between chambers 36 and 38. Under these conditions fluid under pressure in the brake pipe 1 flows to the atmosphere, by way of pipe and passage 54, port 55, chamber 33, port 37 in piston 32, chamber 36, chamber 38 and passage and pipe 39. It will be noted however, the port 37, as before mentioned, will limit the rate of reduction in brake pipe pressure to a service rate.

A reduction in the pressure of fluid in the brake pipe effected in the above manner will cause the triple valve device 2 to operate in the usual and well known manner to effect a service application of the brakes.

If the trainman wishes to effect an emergency application of the brakes, he moves the handle 27 either to the right or left to a position beyond that just described for effecting a service application of the brakes. In this position, which is the emergency position of the handle, both the valve 9 and the valve 10 will be forced from their respective seats 13 and 14.

With valves 9 and 10 both unseated fluid under pressure in chamber 40 of the brake application valve device 6 is quickly vented to the atmosphere, by way of passage 42, pipe 8, chamber 7 in the control valve device 5, past the unseated valves 9 and 10, chamber 18 and passage 19, thus causing a rapid reduction in the pressure of fluid in chamber 40.

Upon thus reducing the pressure of fluid in chamber 40, the pressure of fluid in chamber 33 acting on the piston 31, causes the pistons 31 and 32 to move to their extreme upper positions in which they are brought to a stop by the engagement of the piston stops 57 with the wall 58 of the casing. The pistons in their traverse first overcome the opposing pressure of the spring 52 until their service position is reached and then overcome the combined opposing pressures of the spring 52 and spring 46 of the spring pressed stop.

With the pistons 31 and 32 in this position, the valve 34 is out of sealing engagement with the annular seat rib 35 and the piston 32 is wholly above the port 56, so that direct communication is established from the brake pipe 1 to the atmosphere, by way of pipe and passage 54, port 56, chambers 36 and 38 and passage and pipe 39.

A sudden reduction in brake pipe pressure is thus effected causing the triple valve device 3 to operate in the usual well known manner to effect an emergency application of the brakes.

While one illustrative embodiment of the invention has been described in detail it is not my intention to limit its scope to that embodiment or otherwise than by the terms of the appended claims.

Having now described my invention, what I claim as new and desire to secure by Letters Patent is:

1. In a fluid pressure brake equipment of the type comprising a brake pipe and a brake controlling mechanism operative upon a reduction in brake pipe pressure at either a service rate or an emergency rate for effecting an application of the brakes, in combination, an application valve device subject to brake pipe pressure and an opposing control pressure and operative upon reductions in the control pressure at different rates to effect a reduction in brake pipe pressure at either a service rate or an emergency rate, and valve means selectively operative to effect reductions in the control pressure at said different rates for controlling the operation of said application valve device.

2. In a fluid pressure brake equipment of the type comprising a brake pipe and a brake controlling mechanism operative upon a reduction in brake pipe pressure at either a service rate or an emergency rate for effecting an application of the brakes, in combination, an application valve device provided with a chamber and having a movable abutment subject to the opposing pressures of fluid in the brake pipe and of fluid in said chamber, said application valve device being operative upon a reduction in the pressure of the fluid in said chamber at one rate to effect a service reduction in brake pipe pressure and operative upon a reduction in the pressure of fluid in said chamber at a faster rate to effect an emergency reduction in brake pipe pressure, and means selectively operative to control the rate of reduction in the pressure of fluid in said chamber.

3. In a fluid pressure brake for a vehicle of the type comprising a brake pipe and a triple valve and operative upon a reduction in brake pipe pressure at a service rate to effect a service application of the brakes and upon a reduction in brake pipe pressure at an emergency rate to effect an emergency application of the brakes, in combination, an application valve device mounted on the vehicle for effecting either a service or an emergency reduction in brake pipe pressure, said application valve device comprising a movable abutment having a service position and an emergency position, and control means mounted on the vehicle comprising a plunger operative when depressed a certain degree to effect operation of said abutment to its service position and operative when depressed to a further degree to effect operation of said abutment to its emergency position.

4. In a fluid pressure brake for a vehicle of the type comprising a brake pipe and a triple valve and operative upon a reduction in brake pipe pressure at a service rate to effect a service application of the brakes and upon a reduction in brake pipe pressure at an emergency rate to effect an emergency application of the brakes, in combination, an application valve device mounted on the vehicle for effecting either a service or an emergency reduction in brake pipe pressure, said application valve device comprising a movable abutment having a service position and an emergency position, valve means including a first valve and a second valve, said first valve being operative to effect movement of said movable abutment to said service position and said first and said second valves being operative together to effect movement of said movable abutment to said emergency position and manually operative means for controlling the operation of said valves.

5. In a fluid pressure brake for a vehicle of the type comprising a brake pipe and a triple valve and operative upon a reduction in brake pipe pressure at a service rate to effect a service application of the brakes and upon a reduction in brake pipe pressure at an emergency rate to effect an emergency application of the brakes in combination, an application valve device mounted on the vehicle for effecting either a service or an emergency reduction in brake pipe pressure, said application valve comprising a movable abutment and means carried by the abutment operative at one time for controlling the reduction in brake pipe pressure at a service rate and operative at another time for controlling the reduction in brake pipe pressure at an emergency rate, and a manually operative control valve device operative in one direction for controlling the operation of said abutment to effect a brake pipe reduction at either a service or an emergency rate.

6. In a fluid pressure brake equipment of the type comprising a brake pipe normally charged with fluid under pressure and a brake controlling mechanism operative upon a reduction in brake pipe pressure at either a service rate or an emergency rate for effecting an application of the brakes, in combination, an application valve device having a chamber, and provided with valve means subject to the opposing pressures of fluid in the brake pipe and of fluid in said chamber and operative on a reduction in the pressure of the fluid in said chamber at one rate to effect a service reduction in brake pipe pressure and operative upon a reduction in the pressure of fluid in said chamber at a faster rate to effect an emergency reduction in brake pipe pressure, means for supplying fluid from the brake pipe to said chamber at a restricted rate, and means selectively operative to control the rate of reduction in the pressure of fluid in said chamber, said means comprising a pair of normally seated valves, one of which is operative to effect a reduction in the pressure of fluid in said chamber at said one rate and both of which are operative together to effect a reduction in the pressure of fluid in said chamber at said faster rate.

7. In a fluid pressure brake equipment of the type comprising a brake pipe and a brake controlling mechanism operative upon a reduction in brake pipe pressure at either a service rate or an emergency rate for effecting an application of the brakes, in combination, an application valve device operative to effect a reduction in brake pipe pressure at either a service rate or an emergency rate, valve means operative to control the operation of said application valve device, said application valve device being mounted on the vehicle at a point adjacent the brake pipe and said valve means being mounted on the vehicle at a point a substantial distance from the application valve device, a fluid conducting conduit connecting said application valve device to said valve means, said fluid conducting conduit being of relatively small diameter whereby the volume of the brake pipe is not excessively increased by the conduit, and means associated with the valve means for selectively controlling the operation of the valve means.

8. In a fluid pressure brake equipment for a vehicle, in combination, a brake pipe mounted on the vehicle and normally charged with fluid under pressure, brake controlling means operative upon a reduction in brake pipe pressure at either a service rate or an emergency rate for effecting an application of the brakes, an application valve device operative to effect a reduction in brake pipe pressure at either a service rate or an emergency rate, said application valve device being mounted on the vehicle at a point adjacent the brake pipe whereby the volume of the brake pipe is not materially increased by connection of the application valve device therewith, valve means provided with a relatively small chamber normally charged with fluid under pressure at a restricted rate from the brake pipe, said valve means being operative to reduce the pressure of fluid in said chamber at one rate to control the operation of said application valve device to effect a reduction in brake pipe pressure at a service rate and operative to reduce the pressure of fluid in said chamber at a faster rate to control operation of said application valve device to effect a reduction in brake pipe pressure at an emergency rate, said valve means being mounted within the vehicle at a point remote from said application valve device and connected thereto by a conduit of relatively small diameter, and a handle for actuating said valve means.

9. In a fluid pressure brake equipment of the type comprising a brake pipe and a brake controlling mechanism operative upon a reduction in brake pipe pressure at either a service rate or an emergency rate for effecting an application of the brakes, in combination, an application valve device provided with a chamber and having a movable abutment subject to the opposing pressures of fluid in the brake pipe and of fluid in said chamber, said abutment having a service position and an emergency position, stop means for stopping the abutment in its service position in response to a reduction in the pressure of fluid in said chamber at one rate, said stop means being yieldable to movement of the abutment to emergency position in response to a reduction in the pressure of fluid in said chamber at a faster rate, and means selectively operative to control the rate of reduction in the pressure of fluid in said chamber.

DONALD L. McNEAL.